United States Patent [19]

Hasselbach, Sr.

[11] 4,236,350
[45] Dec. 2, 1980

[54] SEEDLING TRAY ASSEMBLY AND GREENHOUSE

[76] Inventor: Arthur Hasselbach, Sr., P.O. Box 369, Cranbury, N.J. 08512

[21] Appl. No.: 935,366

[22] Filed: Aug. 21, 1978

[51] Int. Cl.³ .......................................... A01G 9/00
[52] U.S. Cl. ........................................ 47/17; 47/69; 47/73; 47/84
[58] Field of Search ............... 47/17, 19, 69, 73, 74, 47/75, 76, 77, 78, 84, 85, 86, 87, 81

[56] References Cited

U.S. PATENT DOCUMENTS

| | | | |
|---|---|---|---|
| 1,865,960 | 7/1932 | Regelson | 47/85 |
| 2,039,442 | 5/1936 | Mulford | 47/73 |
| 3,009,291 | 11/1961 | Blackmore | 47/87 |
| 3,095,670 | 7/1963 | Raab | 47/17 |
| 3,106,801 | 10/1963 | Risacher | 47/17 |
| 3,576,088 | 4/1971 | Arca | 47/81 |
| 3,664,062 | 5/1972 | Danielson | 47/87 |
| 3,667,159 | 6/1972 | Todd | 47/87 |

Primary Examiner—Edgar S. Burr
Assistant Examiner—James R. Feyrer
Attorney, Agent, or Firm—Eugene E. Geoffrey, Jr.

[57] ABSTRACT

A seedling tray assembly and greenhouse which includes a base, a sheet of embossed material in said base and spaced from the bottom thereof, a seedling grid resting on said embossed material and a deeply dished cover overlying said base and seedling grid.

3 Claims, 8 Drawing Figures

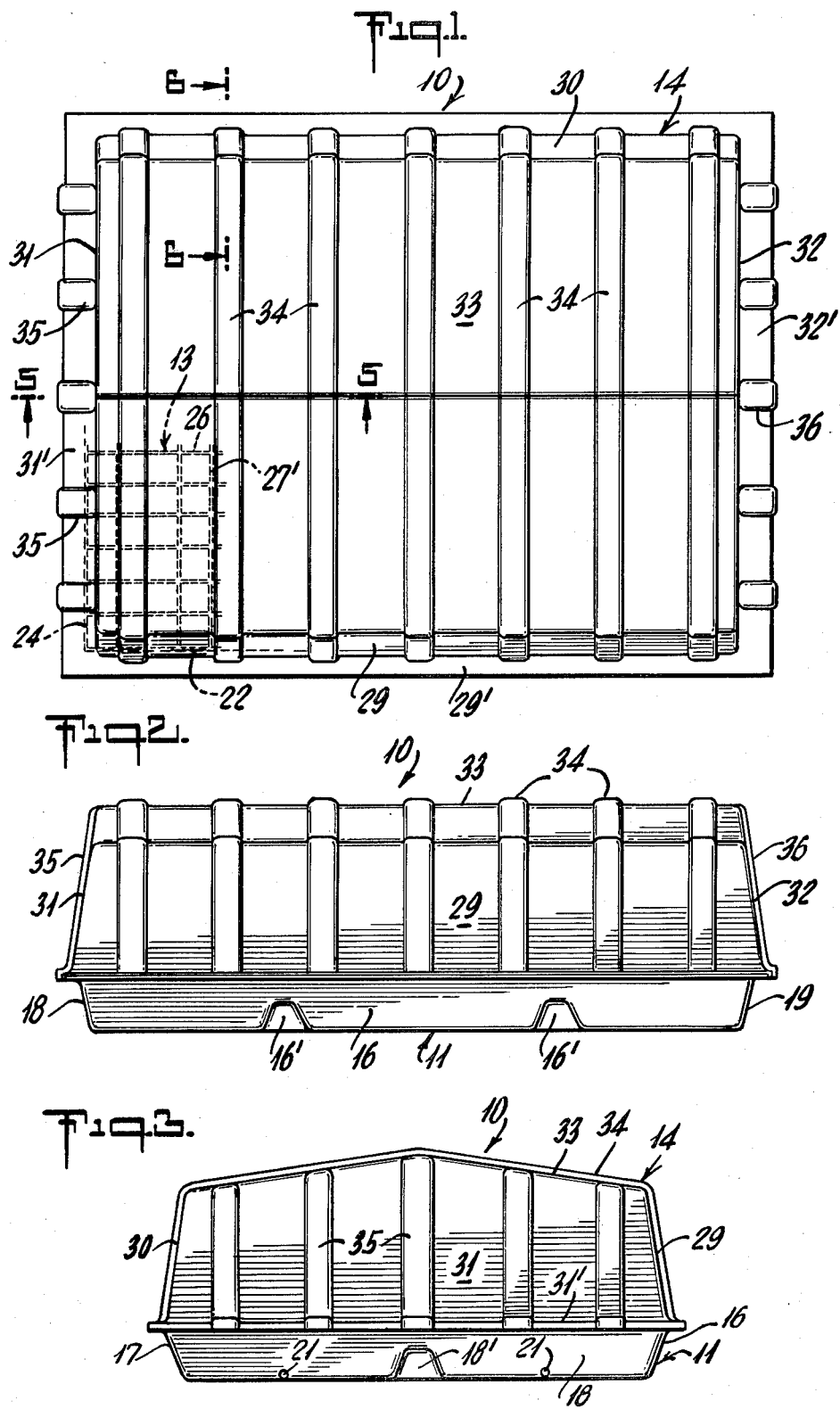

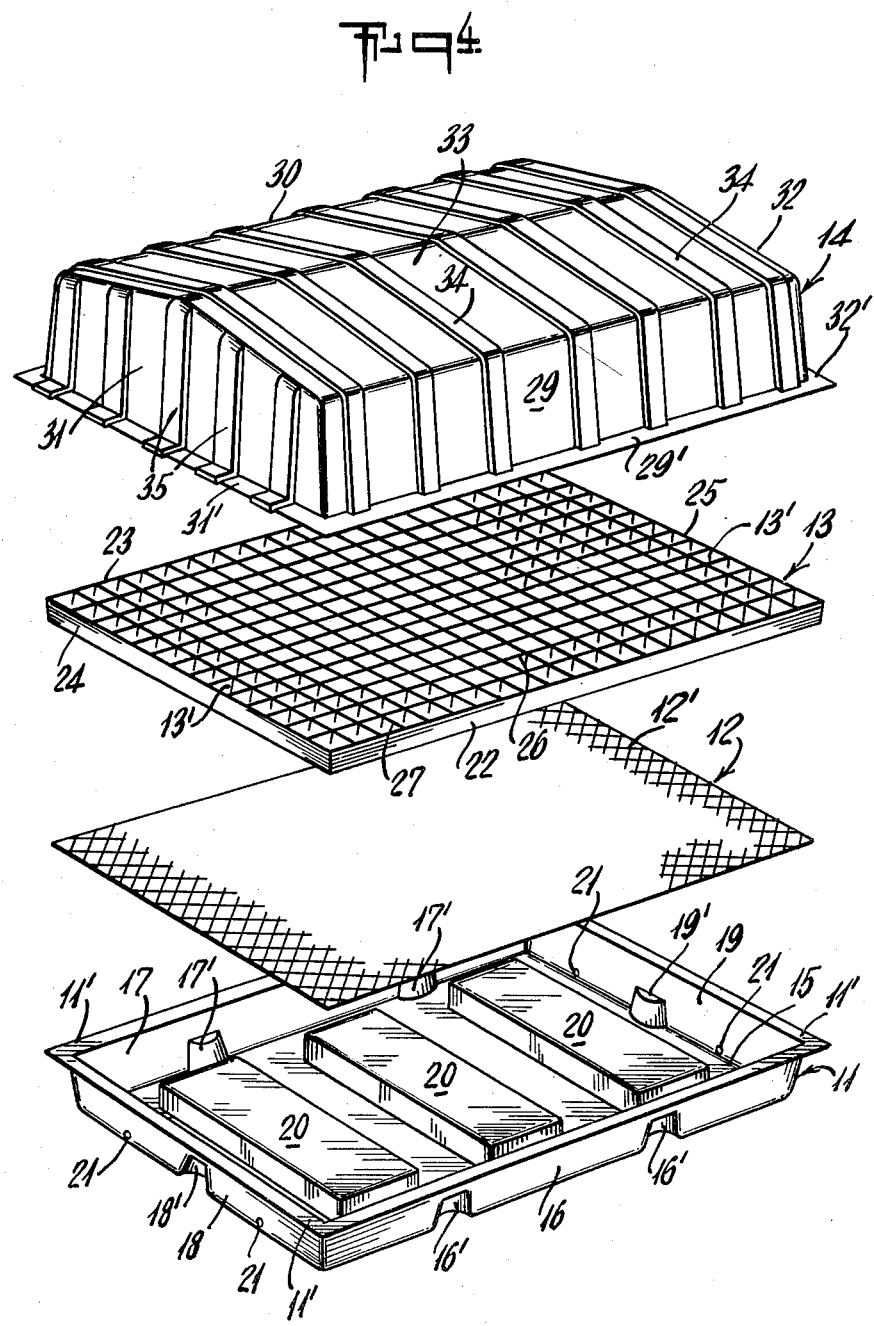

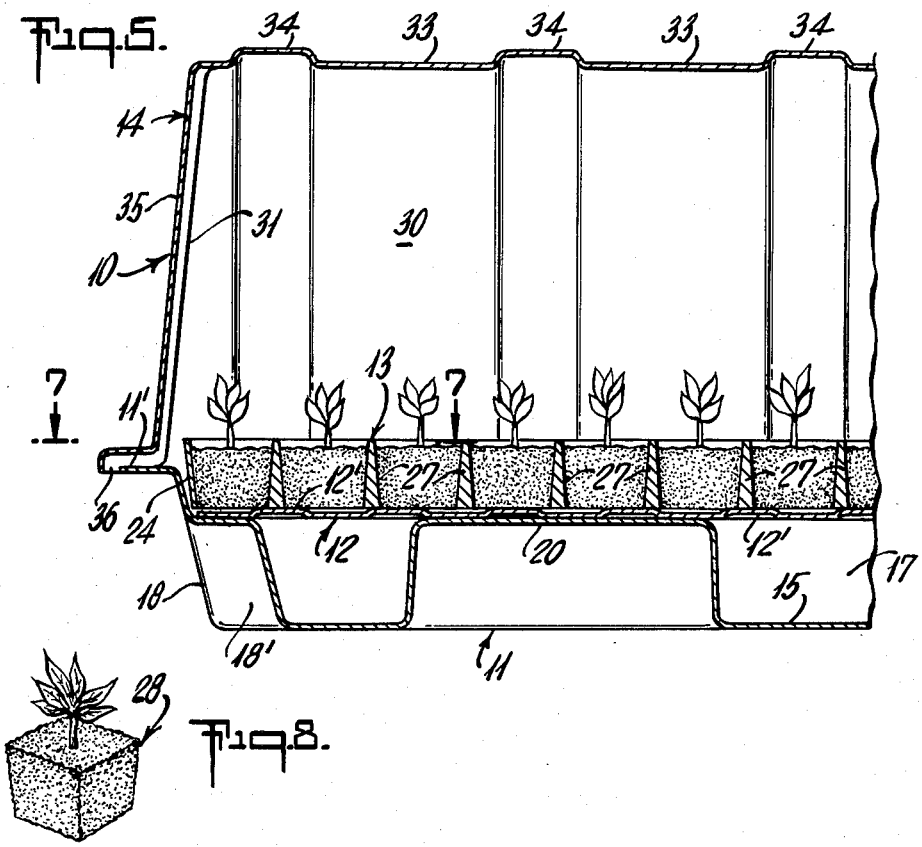
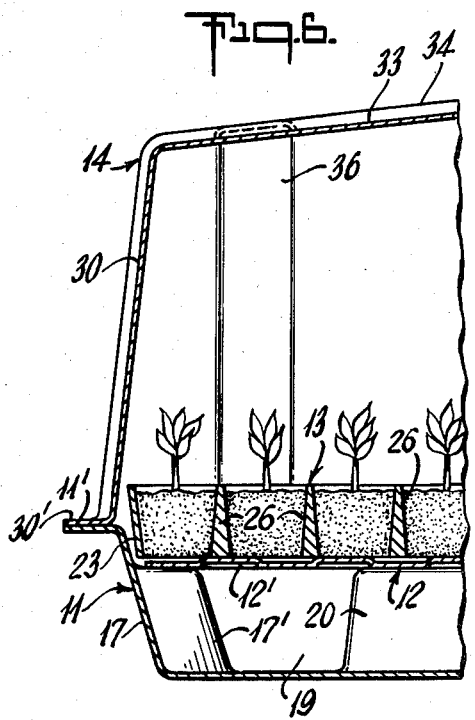
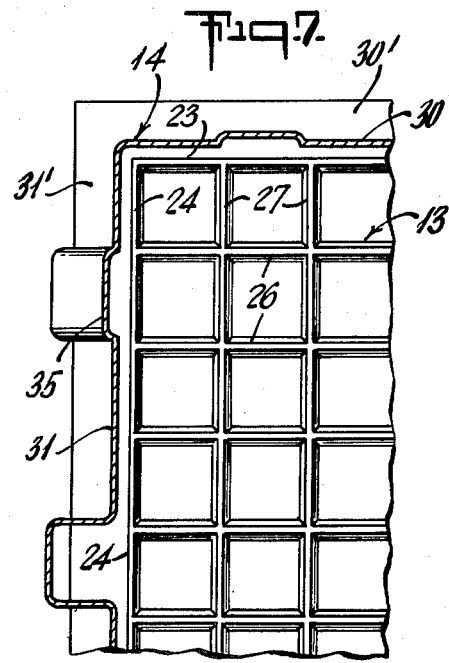

SEEDLING TRAY ASSEMBLY AND GREENHOUSE

This invention relates to a seedling tray assembly and greenhouse and more specifically to a novel and improved structure for the germination of seeds which reduces the possibility of over watering and at the same time provides substantially uniform moisture for all of the plants.

Numerous prior devices have been suggested for germinating seeds which utilize a plurality of small compartments arranged to hold soil for the seed germination and which provide for removal of the seedlings substantially intact with the soil for transplanting. Known devices however are relatively complicated in construction and while providing some drainage do not provide a controlled drainage in such a manner that excess water in certain of the compartments can be utilized to provide supplemental water for plants in other compartments which may not have been adequately watered. Known structures are also relatively complicated and expensive to manufacture and are not readily suitable for both home and commercial production of seedlings.

The seedling tray assembly in accordance with the invention overcomes the aforementioned difficulties with prior structures and provides a novel and improved arrangement and organization of elements which not only prevents over watering but also provides for substantially uniform distribution of water to the plants in the event certain of the plants have received excess water while other plants have been inadequately watered.

Another object of the invention resides in a novel and improved seedling assembly or greenhouse which is arranged to provide a high degree of durability, facilitate assembly and simplify introduction of the seedling growing formula and removal of the seedlings without disturbing the growth.

Still another object of the invention resides in a novel and improved seedling assembly and greenhouse characterized by its simplicity and relatively low cost.

Still another object of the invention resides in the provision of a novel and improved seedling assembly and greenhouse readily adaptable for use in the home as well as for mass production of seedlings.

The seedling assembly or greenhouse in accordance with the invention includes a relatively deep base portion, a flat sheet of moisture resistant material disposed within the base portion and spaced above the bottom thereof a seedling grid overlying said sheet of material and disposed at least partially within the base portion and an overlying dished cover supported by the edges of the base portion and which includes ventilating openings to provide for the circulation of air therethrough.

The above and other objects and advantages of the invention will become more apparent from the following description and accompanying drawings forming part of the application.

IN THE DRAWINGS

FIG. 1 is a plan view of the seedling assembly and greenhouse in accordance with the invention.

FIG. 2 is a side elevational view of the seedling assembly shown in FIG. 1.

FIG. 3 is an end view of the seedling assembly shown in FIG. 1.

FIG. 4 is an exploded perspective view of the seedling assembly shown in FIG. 1.

FIG. 5 is a partial cross sectional view of FIG. 1 taken along the line 5—5 thereof.

FIG. 6 is a partial cross sectional view of FIG. 1 taken along the line 6—6 thereof.

FIG. 7 is a partial cross sectional view of FIG. 5 taken along the line 7—7 thereof.

FIG. 8 is a perspective view of a seedling after removal from the seedling grid and preparatory to transfer to a larger container for continued growth.

The seedling assembly and greenhouse in accordance with the invention is generally denoted by the numeral 10 and comprises a base 11, a sheet of material 12, a grid 13 for containing the seedlings and a deeply dished cover 14. These elements are assembled in order illustrated in FIG. 4 though in commercial establishments the utilization of the dished cover is optional as automatic watering devices are generally employed for watering large groups of seedling assemblies or trays in accordance with the invention.

The base 11 of the seedling assembly includes a bottom 15, side walls 16 and 17 and end walls 18 and 19. A cover supporting lip 11' extends outwardly from the walls 16 through 19. The bottom wall 15 includes, in the instant embodiment of the invention, three raised portions 20 in order to support the relatively thin sheet of material 12. In addition, the side and end walls include recesses 16', 17', 18' and 19' having flat upper surfaces extending inwardly of the base to support the edges of the sheet of material 12. This arrangement causes the material 12 to lie flat within the base 11 and also spaced from the bottom thereof to provide for the drainage of water. Openings 21 in the end walls 18 and 19 may also be provided for the removal of excess water. While the raised portions 20 and the recesses 16' through 19' have been found to be effective in supporting the sheet of material 12 it is quite evident that other suitable means may be employed within the base 11 in order to support the sheet 12. While the base 11 and the sheet material 12 may be formed of any suitable type of material, a readily formable plastic is preferred such as polyethylene, polyvinyl chloride and the like.

The sheet of material 12 which is positioned within the base 11 preferably includes embossments 12' distributed throughout the surface thereof to provide channels for the distribution of excess water in order to distribute the water substantially uniformly to all of the seedlings. If excess water is applied to all of the seedlings then the water will drain to the bottom of the seedling grid and be discharged from the sides of the sheet of material 12 into the base 11.

The seedling grid 13 may be made of any size and the size of the compartments 13' may also be modified as desired. It is important however that the base 11 and the sheet of material 12 be coordinated in configuration to accommodate the grid 13. In the formation of the grid 13, the side walls 22 and 23 and the end walls 24 and 25 are inclined upwardly and outwardly as will be observed more clearly in FIGS. 5 and 6. The longitudinal and transverse partitions 26 and 27 as shown in FIGS. 6 and 5 respectively are also of a tapered construction with the widths of the bottom portions of the partitions being substantially greater than the widths of the upper portions. With this arrangement, removal of the seedlings together with the growing formula is facilitated and a seedling 28 ready for planting is illustrated in FIG. 8. It will also be observed in both FIGS. 5 and 6 that the embossments 12' are distributed over the surface of the sheet of material to facilitate distribution of the water over the surface of the sheet.

The dished cover 14 may be formed in any desired manner though in the instant embodiment of the invention the side walls 29 and 30 and the end walls 31 and 32 slope upwardly and slightly inwardly and the top wall 33 is slightly peaked at the center. The edge of the cover has a peripheral flange 31' which cooperates with the lip or flange 11' on the base. In order to provide adequate stiffness, a plurality of ribs 34 are formed transversely of the cover and extend continuously from one side wall across the top 33 and down the remaining side wall. The ends 31 and 32 are also provided with stiffening ribs 35. The stiffening ribs 35 on the end walls 31 and 32 also extend to the edge of the flange 31' and beyond the flange 11' surrounding the edge of the base 11 as shown more specifically in FIG. 4 in order to provide vent openings 36 for the flow of air to ventillate the greenhouse. At the same time, the cover prevents or at least minimizes evaporation of moisture.

While only one embodiment of the invention has been illustrated and described, it is apparent that alterations, changes and modifications may be made without departing from the true scope and spirit thereof.

What is claimed is:

1. A seedling tray comprising a base having a bottom, side walls and end walls, a flat sheet of water impervious material disposed within said base and spaced from the bottom thereof and a seedling holding grid overlying and resting on said sheet of material, said grid having longitudinal and transverse intersecting wedge shaped partitions to provide upwardly diverging tapered compartments for holding the seedlings, said base including means formed in the bottom, side and end walls for supporting said sheet of material in spaced relationship to the bottom to provide space for receiving and redirecting excess water to water drainage openings, said drainage openings adjoining the bottom wall, said flat sheet of material having upwardly formed criss-crossed embossments to provide for the temporary accumulation of and distribution of water beneath said seedling holding grid whereby water is uniformly distributed among the grid compartments.

2. A seedling tray according to claim 1 including a deeply dished cover carried by said base and enclosing the grid compartments.

3. A seedling tray according to claim 2 including venting means carried by said cover to provide for the flow of air therethrough when in place on said base.

* * * * *